UNITED STATES PATENT OFFICE.

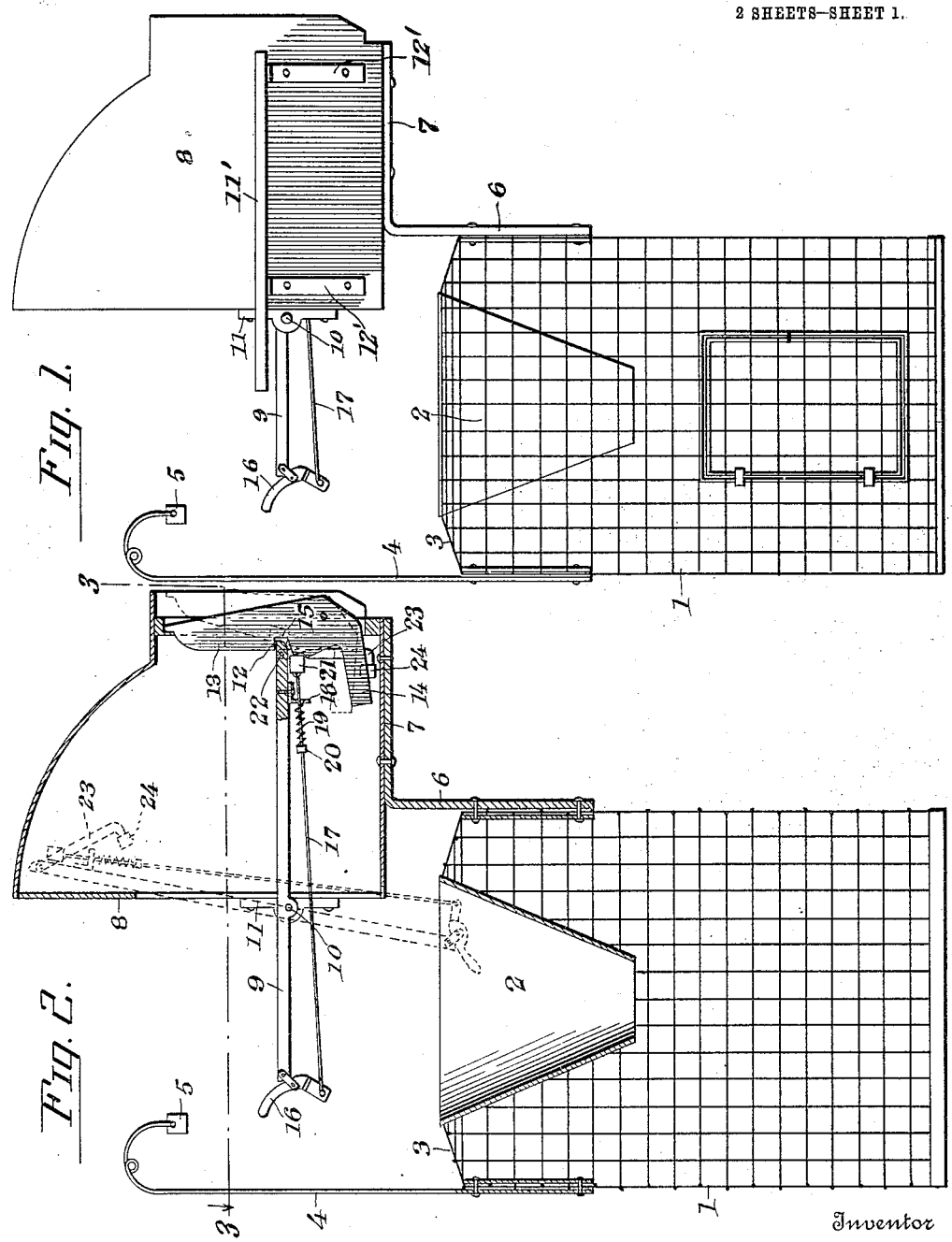

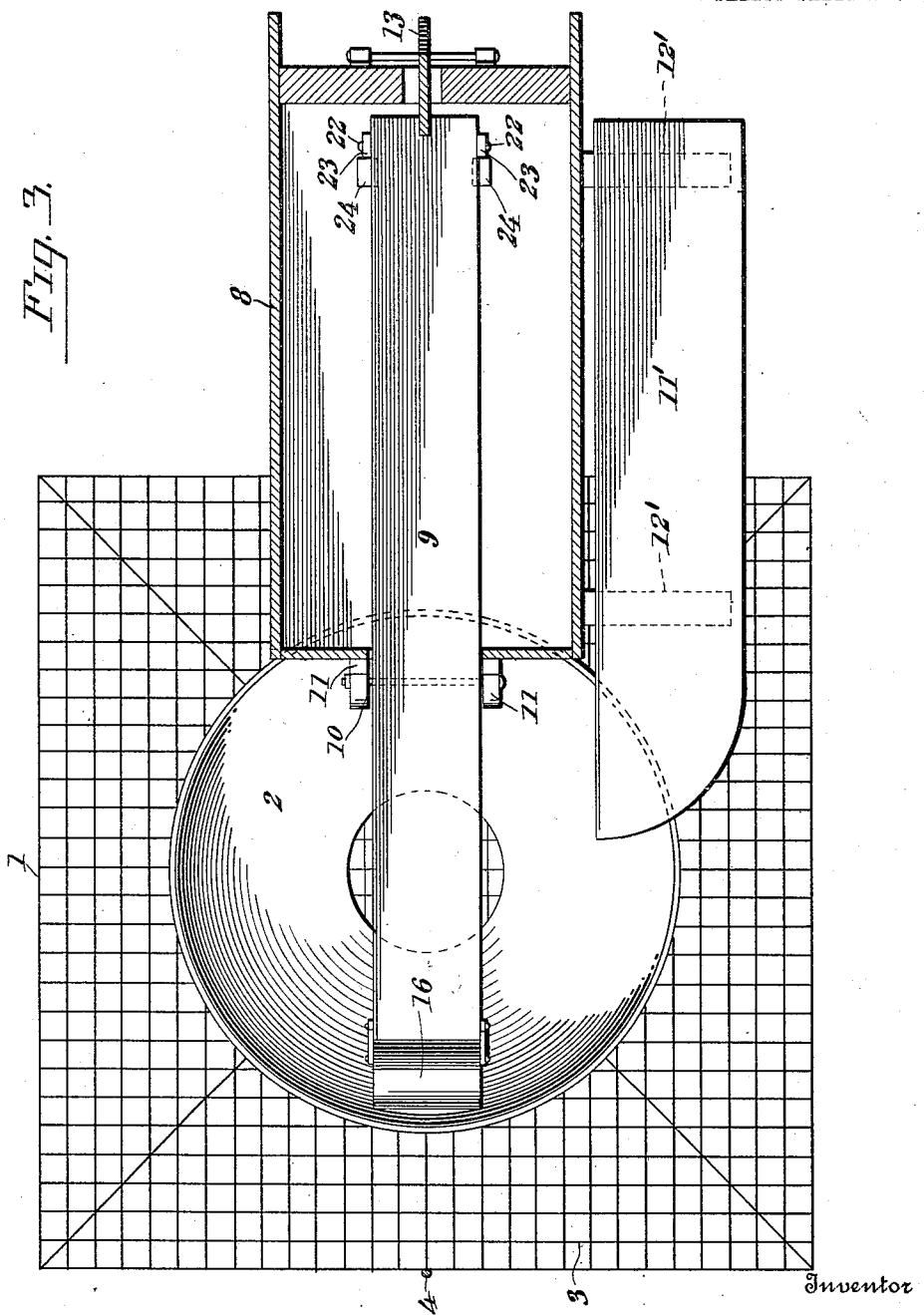

DANIEL A. SHEA, OF BELLEFONTAINE, OHIO.

TRAP.

1,069,297.

Specification of Letters Patent. Patented Aug. 5, 1913.

Application filed August 31, 1912. Serial No. 718,068.

*To all whom it may concern:*

Be it known that I, DANIEL A. SHEA, a citizen of the United States, residing at Bellefontaine, in the county of Logan and State of Ohio, have invented new and useful Improvements in Traps, of which the following is a specification.

This invention relates to self setting traps, the object in view being to provide a trap for catching rats and other animals, which will immediately reset itself after the catch of each animal, said trap embodying simple mechanism all exposed outside of the cage itself, and operating under the weight of the animal to trip the support or platform on which the animal is temporarily resting, so that the animal is precipitated into the cage below.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a trap embodying the present invention. Fig. 2 is a vertical section of the same, showing the trap set in full lines and sprung in dotted lines. Fig. 3 is a horizontal section on the line 3—3 of Fig. 2.

In carrying out this invention, I employ a reticuled cage 1 of any desired size, according to the number and size of the animals to be entrapped. This cage is entirely closed on all sides, and on the bottom, and in the top thereof is fitted an inverted frusto-conical throat 2 connected to the cage by means of an annular and inclined top wall 3. Connected to one side of the cage is a rod or wire 4 which extends upward to any desired distance above the top of the cage, where it is provided with a cup 5, in which any suitable bait is adapted to be placed, the cup being held over the top of the funnel 2. At the opposite side of the cage, there is a bracket 6 having a horizontally extending arm 7, upon which is fastened a housing 8. Extending through the inner wall of this housing is a tilting platform 9 relatively long and narrow, the same being fulcrumed, at 10, on the bracket 11 secured to the inner wall of the housing, as shown. At one side of this housing, a shelf 11' is supported by brackets 12' secured to the housing, said shelf forming a perch for the animals before they step upon the tilting platform.

At its outer end, the tilting platform 9 is engaged by a shoulder 12 on the gravity catch 13, the same being provided with an inwardly extending combined stop arm and weight 14 at the bottom thereof, which arm serves to throw the upper portion of the catch inward, while allowing it to move outward when actuated by the means, hereinafter described. The shoulder 12, it will be seen, is formed by providing the catch with a notch 15.

Connected pivotally to the outer end of the platform 9, which overhangs the cage 1, is a trip step 16, and extending from said trip step 16 is a plunger rod 17 which passes through a guide 18 on the bottom of the platform 9 and adjacent to the inner end thereof. A coiled spring 19 is interposed between the guide 18 and a shoulder 20 on the rod or plunger 17, said spring 19 acting on the rod 17 to return the trip step 16 to its normal operative position.

Secured to the inner end of the plunger or rod 17 is a head piece 21 which is adapted to come into contact with the adjacent edge of the gravity catch 13, in order to push said catch out of engagement with the inner end of the tilting platform 9, when the animal places its feet on the step 16 in an attempt to reach the bait in the cup 5.

Connected pivotally at 22 to the platform 9, at opposite sides thereof and near the inner end of the same, are two pivoted arms 23, to the bottom ends of which are attached weights 24. In this way, the inner end of the platform is weighted, so as to insure its return to a substantially horizontal or set position, after an animal has been dumped therefrom through the funnel 2 into the cage 1.

From the foregoing description, the operation of the trap will now be clearly apparent. In order to reach the bait 5, the animal has to step upon the projecting end of the platform 9 which overhangs the funnel-shaped throat 2. In a further attempt to reach the bait, the animal rests a portion of its weight upon the trip step 16. This depresses the step 16 and through the medium of the plunger the catch is pressed backward out of engagement with the inner end of the platform 9. This causes the projecting end of the platform to drop suddenly and precipitate the animal into the funnel-shaped entrance throat 2, and thence through the open bottom thereof into the cage 1. Immediately afterward, the tilting platform returns to its normal position and is again engaged and held by the gravity catch 13.

What is claimed is:

1. A self-setting trap, comprising a receiving cage, an inverted frusto-conical entrance throat in the top thereof, a tilting platform having one end thereof overhanging the cage throat, a gravity operated catch engaging the other end of the platform, a trip step pivotally mounted on the overhanging end of the platform, and a plunger pivotally connected to an arm of said trip step and engaging the catch to move the latter out of engagement with said platform.

2. A self-setting trap, comprising a receiving cage, an inverted frusto-conical entrance throat in the top thereof, a tilting platform having one end thereof overhanging the cage throat, a weight attached to the other end of the platform, a gravity catch engaging the weighted end of the platform, a trip step at the overhanging end of the platform, and a plunger actuated by said trip step and operating to move the catch out of engagement with said platform.

3. A self-setting trap, comprising a receiving cage, an inverted frusto-conical entrance throat in the top thereof, a tilting platform having one end thereof overhanging the cage throat, a gravity operated catch engaging the other end of the platform, a trip step pivotally mounted on the overhanging end of the platform, and a plunger pivotally connected to an arm of said trip step and engaging the catch to move the latter out of engagement with said platform, and a spring surrounding said plunger and operating to reset said trip step.

In testimony whereof I affix my signature in presence of two witnesses.

DANIEL A. SHEA.

Witnesses:
GEO. H. ALLEN,
R. E. BROOKS.

---

Copies of this patent may be obtained for five cents each, by addressing the "Commissioner of Patents, Washington, D. C."